United States Patent
Fynbo et al.

(10) Patent No.: US 12,264,652 B2
(45) Date of Patent: Apr. 1, 2025

(54) YAW CONTROL USING MEAN MOTOR SPEED REFERENCE AS FEEDBACK

(71) Applicant: VESTAS WIND SYSTEMS A/S, Aarhus (DK)

(72) Inventors: Peter Fynbo, Ørsted (DK); Jesper Lykkegaard Neubauer, Hornslet (DK); Jens-Kristian Egsgaard Langkjær, Aarhus (DK); Niels Henrik Pedersen, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 7 days.

(21) Appl. No.: 17/916,284

(22) PCT Filed: Mar. 29, 2021

(86) PCT No.: PCT/DK2021/050092
§ 371 (c)(1),
(2) Date: Sep. 30, 2022

(87) PCT Pub. No.: WO2021/197559
PCT Pub. Date: Oct. 7, 2021

(65) Prior Publication Data
US 2023/0038784 A1    Feb. 9, 2023

(30) Foreign Application Priority Data
Mar. 30, 2020    (DK) .......................... PA 2020 70195

(51) Int. Cl.
*F03D 7/04*    (2006.01)
*F03D 7/02*    (2006.01)

(52) U.S. Cl.
CPC .......... *F03D 7/044* (2013.01); *F03D 7/0204* (2013.01); *F05B 2270/1095* (2013.01); *F05B 2270/327* (2013.01); *F05B 2270/602* (2013.01)

(58) Field of Classification Search
CPC ........ F03D 7/044; F03D 7/0204; F03D 7/047; F05B 2270/1095; F05B 2270/327;
(Continued)

(56) References Cited

U.S. PATENT DOCUMENTS 8,162,608 B2    4/2012    Birkemose et al.
2009/0232652 A1    9/2009    Keller et al.
(Continued)

FOREIGN PATENT DOCUMENTS

CN    110145437 A    8/2019
EP    2037119 A1    3/2009
(Continued)

OTHER PUBLICATIONS

Danish Patent and Trademark Office, 1st Technical Examination including the Search Report for Application PA 2020 70195, dated Oct. 14, 2020.
(Continued)

*Primary Examiner* — Joseph Ortega
(74) *Attorney, Agent, or Firm* — Patterson + Sheridan, LLP

(57) ABSTRACT

Techniques for controlling the yaw of a wind turbine system by controlling a plurality of yaw drive actuators. Based on a requested motor speed reference as an input signal, and a mean motor speed reference as a feedback signal, the method determines a required motor torque reference as an output signal for the plurality of yaw drive actuators. The plurality of yaw drive actuators rotates a nacelle or a structure comprising a plurality of nacelles such that an even load distribution is provided for the plurality of yaw drive actuators.

15 Claims, 6 Drawing Sheets

(58) Field of Classification Search
CPC ............ F05B 2270/602; F05B 2240/40; F05B 2270/111; Y02E 10/72
See application file for complete search history.

(56) References Cited

U.S. PATENT DOCUMENTS

| | | |
|---|---|---|
| 2013/0088009 A1 | 4/2013 | Cousineau et al. |
| 2015/0275858 A1* | 10/2015 | Frederiksen .......... F03D 7/0204 |
| | | 415/4.5 |
| 2016/0089982 A1 | 3/2016 | Ienaga |
| 2018/0180029 A1* | 6/2018 | Caponetti ............... F03D 17/00 |
| 2019/0003457 A1* | 1/2019 | Miranda ............... F03D 7/0296 |

FOREIGN PATENT DOCUMENTS

| | | |
|---|---|---|
| EP | 2402597 A1 | 1/2012 |
| EP | 2404058 A2 | 1/2012 |
| EP | 2754886 A1 | 7/2014 |
| EP | 2754887 A1 | 7/2014 |
| EP | 3018344 A1 | 5/2016 |
| WO | 2018157897 A1 | 9/2018 |
| WO | 2021197559 A1 | 10/2021 |

OTHER PUBLICATIONS

PCT, International Search Report for Application PCT/DK2021/050092 dated Feb. 7, 2021.
Zhi Wu et al. "Research on Active Yaw Mechanism of Small Wind Turbines," Energy Procedia, vol. 16, Date: Jan. 1, 2011, pp. 53-57.
PCT, Written Opinion of the International Searching Authority for Application PCT/DK2021/050092 dated Feb. 7, 2021.

* cited by examiner

YAW CONTROL USING MEAN MOTOR SPEED REFERENCE AS FEEDBACK

FIELD OF THE INVENTION

The present invention relates to a method for controlling the yaw of a wind turbine system, more particular for controlling the plurality of yaw drive actuators.

BACKGROUND OF THE INVENTION

The yaw system has the task of orienting the nacelle in relation to the wind. Most of the time the yaw system is inactive or parked. Only when the orientation of the nacelle needs to be changed, usually due to changes in the wind direction, the yaw system is active to turn the nacelle into the wind.

In a normal operation mode, the deviation between the nacelle and the wind direction, the yaw angle, is supposed to be as small as possible to avoid power production loss and to reduce loads. However, at the same time the yaw system must not respond to sensitively, to avoid continuous small yaw movements, which would reduce the life of the mechanical components.

In modern wind turbine systems a plurality of yaw drive actuators are used in the yaw system to orient the nacelle in relation to the wind. In such a system a plurality of yaw drive actuators are engaged with a single yaw ring, any yaw drive actuator which deviates from common operation will lead to uneven wear on that yaw drive actuator and it is therefore important to operate the yaw drive actuators in a manner which ensures as even operational conditions among the plurality of yaw drive actuators as possible.

Hence, an improved method for controlling the yaw system would be advantageous, and in particular a more efficient and/or reliable method to control a plurality of yaw drive actuators would be advantageous.

SUMMARY OF THE INVENTION

It is an object of the invention to provide, when the yaw system is active, an even load distribution for a plurality of yaw drive actuators.

It is also an object of the invention to improve control methods of wind turbines, particularly to controlling methods, which improve lifetime of components of the yaw system.

Thus, the above described objects and several other objects are intended to be obtained in a first aspect of the invention by providing a method for controlling the yaw of a wind turbine system, the wind turbine system comprises a nacelle, a tower, a turbine controller and a yaw system, the yaw system is operable to rotate the nacelle with respect to the tower,
the yaw system comprises a motor controller and a plurality of yaw drive actuators,
wherein the motor controller receives
    a requested motor speed reference, as an input signal, and
    a mean motor speed reference, as a feedback signal, and
the motor controller provides
    a required motor torque reference, as an output signal, for the plurality of yaw drive actuators to rotate the nacelle, determined according to the input signal and the feedback signal.

By basing the required motor torque reference for the plurality of yaw drive actuators on a mean motor speed reference as feedback signal, a control scheme with a virtual master drive is provided, the virtual master drive being constructed based on the mean motor speed. In this way, loads are shared in relation to the virtual master drive that is in accordance with a drive operating with the mean speed. As a result, the invention is particularly, but not exclusively, advantageous for obtaining an even load distribution for a plurality of yaw drive actuators. Hereby each yaw drive actuator substantially delivers the same torque, performs an even action avoiding imbalances, and avoids a single yaw drive actuator to be overloaded and thereby improve lifetime of the yaw system as well as production capabilities of the wind turbine due to reduced down time, where the wind turbine is not producing power.

The yaw system comprises a plurality of yaw drive actuators, each comprising a motor and a pinion connecting the yaw drive actuator. The yaw system further comprises a yaw ring to which the plurality of actuators are connected. The yaw ring it located on the tower to allow the nacelle to rotate. Further, the yaw drive actuators comprises a variable frequency drive. In this document, the variable frequency drives are generally considered part of the yaw drive actuators even though the variable frequency drives can be located separated from the other parts of the motor.

Yawing or rotating is understood as is common in the art, as rotation of the nacelle.

The motors are preferable electrical drive motors which typically will be asynchronous induction motors, but also can be permanent magnet motors and are each powered by a separate variable frequency drive, enabling individual motor control. The variable frequency drives are connected to the motor controller in the yaw system and receives a required motor torque reference from the motor controller. Alternatively, the motors can be hydraulic drive motors.

A tower can be any support structure or construction on which one or more nacelles can be mounted and be rotatable relative to the tower. The tower can comprise support arms, with nacelles mounted on each support arm, therefore, the wording "to rotate the nacelle with respect to the tower" also covers when a nacelle, placed on a support arm, is rotated. Further, an embodiment is possible, wherein the support arms are rotatable relative to the tower, so that the nacelles all are rotated simultaneous relative to the tower, when the support arms are rotated relative to the tower; therefore, the wording "to rotate the nacelle with respect to the tower" also covers this situation.

According to an embodiment, the method comprises that when the yaw system is operating in a normal operation mode, the motor controller calculates one required motor torque reference, and the motor controller sends the one required motor torque reference to all of the plurality of yaw drive actuators.

The yaw system is operating in a normal operation mode when the yaw system is active and is turning the nacelle into a new position relative to the wind. The motor controller under normal operation calculates a required motor torque reference and sends it to all the yaw drive actuators. This is advantageous for obtaining an even load distribution for the plurality of yaw drive actuators and also simplifies the control as only one required motor torque reference is calculated. Therefore, under normal operation the yaw drive actuators are operated as one.

To calculate the required motor torque reference the motor controller receives from a turbine controller a requested motor speed reference as an input signal, and a mean motor speed reference is determined as a feedback signal. The mean motor speed reference can be determined by the turbine controller or by the motor controller itself. If the motor controller determines the mean motor speed reference this is done in a separate computing block as to the computing block handling the feedback control. The requested motor speed reference is a request from the turbine controller to yaw the nacelle, e.g. with a certain speed.

According to an embodiment, the method comprises that each yaw drive actuator comprises a motor, and the mean motor speed reference is calculated as the average of the motor speed of all motors.

According to an embodiment, the method comprises that each yaw drive actuator comprises a motor, and the mean motor speed reference is calculated as the average of the motor speed of a selected subgroup of motors.

According to an embodiment, the method comprises that the selected subgroup of motors do not include, in the calculation of the mean motor speed reference, the motors with a motor speed higher than a high-speed threshold speed and/or the motors with a motor speed lower than a low-speed threshold speed.

It is advantageous to be able to exclude some motors from the calculation of the mean motor speed reference in case some motors are not operating or are operating with speeds that differs considerable from the other motors. This can happen typically when starting up the yawing, if an actuator has to rotate a larger distance than the other actuators for the pinion to engage with the gear of the yaw ring. This can for instance happen if there is a broken tooth in the yaw ring.

According to an embodiment, the method comprises that the required motor torque reference is limited by a torque limiter to not exceeding a maximum torque.

The maximum torque is determined by the maximum capacity of the motor and is thereby held constant. It is therefore not possible for the motor to deliver a torque higher than the maximum torque, and it is advantageous to include the maximum torque in the calculation of the required motor torque reference to handle the system in a controlled manner.

According to an embodiment, the method comprises that the required motor torque reference is limited to avoid a motor speed that is higher than the maximum motor speed.

In an embodiment, the maximum motor speed should not be exceeded, even if it may be possible to run the motors a little faster than the maximum motor speed, as it is not desirable to do so risking overloading the motor and possible damaging the motor. It is advantageous to include the maximum motor speed in the calculation of the required motor speed torque reference so that the process is controlled and the expected consequences can be included in the control.

According to an embodiment, the method comprises that the motor controller further receives as input a maximum power use reference and wherein, a limited motor speed reference is limited to not requiring more power than available according to the maximum power use reference.

It is advantageous in case there is limited power available to control the use of the power available to distribute the power to the motors in a controlled manner.

To do this it is advantageous to not allow a higher power use than the available power makes possible so that the process is controlled and the expected consequences can be included in the control.

According to an embodiment, the method comprises that the change in motor speed is not exceeding a maximum speed change rate.

It is advantageous, especially during start-up, to avoid having a high transient peak torque caused by trying to accelerate the motors more than the system can handle in an efficient and controlled manner. Therefore, a speed ramp is implemented to limit the acceleration to a maximum speed change rate. Limiting the acceleration reduce risks of damaging or overloading the motors.

According to an embodiment, the method comprises that the motor controller comprises a dynamic speed limiter,
   the dynamic speed limiter calculates a limited motor speed reference based on the requested motor speed reference and the maximum power use reference, so that
   the limited motor speed reference is not higher than the maximum motor speed, and
   the change in motor speed is not exceeding a maximum speed change rate, and
   the power use is not exceeding the maximum power use reference.

The dynamic speed limiter is a function in the motor controller that calculates the limited motor speed reference taking in account different parameters to avoid exceeding the maximum motor speed and the maximum power use and also avoiding to high acceleration of the motors.

If there is no risk of exceeding the limiting parameters the limited motor speed reference has the same value as the requested motor speed reference.

According to an embodiment, the method comprises that the motor controller comprises a speed control unit, the speed control unit comprises a PID control,
   the PID control calculates a calculated motor torque reference based on the limited motor speed reference and the mean motor speed reference, and
   the calculated motor torque reference is used to determine the required motor torque reference.

The speed control unit is a function in the motor controller comprising a PID control. A PID (proportional-integral-derivative) controller is a control loop mechanism employing feedback that is widely used in industrial control systems requiring continuously modulated control. The PID controller continuously calculates an error value as the difference between a desired set point, in this case the limited motor speed reference, and a measured process variable, in this case the mean motor speed reference, and applies a correction based on proportional, integral, and derivative terms (denoted P, I, and D respectively), hence the name. In the PID controller, the D can be zero, and in that case, the PID control is a PI control.

According to an embodiment, the method comprises that the speed control unit further comprises a torque limiter,
   the torque limiter determines the required motor torque reference based on the calculated motor torque reference, so that
   the required motor torque reference is not exceeding a maximum torque.

The torque limiter is a subfunction in the speed control unit. The torque limiter function is a programmed function that ensures that the motor torque reference is not exceeding the maximum torque. The speed control unit and the torque limiter is implemented as part of the motor controller, the implementation can be done in many different ways programmed in software as part of the motor controller or in separate software routines used by the motor controller.

According to an embodiment, the method comprises that the wind turbine system comprises a plurality of nacelles and the yaw system is arranged to rotate one or more of the plurality of nacelles. Thus, the method of the invention can also be applied to a multi-rotor wind turbine.

In a multi-rotor turbine, the nacelles may be mounted on support arms or other support structures allowing more nacelles mounted on the same wind turbine system. The method of the invention can be used to the plurality of nacelles individually, so that a single nacelle placed on a support arm can be rotated while the other nacelles are not being rotated. The method can also be used to rotate all the nacelles by rotating the entire structure, on which the plurality of nacelles is mounted, so that the plurality of nacelles are rotated simultaneous. The plurality of nacelles is then rotated relative to the tower and therefore each individual nacelle is also rotated relative to the tower.

A second aspect of the invention relates to a control system for controlling the yaw of a wind turbine, where the control system is arranged to perform the steps according to the method of the first aspect.

A third aspect of the invention relates to a wind turbine, where the wind turbine further comprises a control system for controlling the yaw of the wind turbine system according to the second aspect.

A fourth aspect of the invention relates to a computer program product comprising software code adapted to control a wind turbine when executed on a data processing system, the computer program product being adapted to perform the method of the first aspect.

The different parts of the motor controller, the dynamical speed limiter, the speed control the torque limiter etc. can be implemented in separate computer programs or as different functions in the same computer program running on the same or on separate microprocessors. Likewise, the motor controller and the turbine controller can be implemented in different software programs running on separate computers or microprocessors, or be implemented in the same software programs running on the same computer or microprocessor or in any combination hereof.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE FIGURES

Embodiments of the invention will be described, by way of example only, with reference to the drawings, in which.

The figures show one way of implementing the present invention and is not to be construed as being limiting to other possible embodiments falling within the scope of the attached claim set.

DETAILED DESCRIPTION OF EMBODIMENTS

Figure 1:
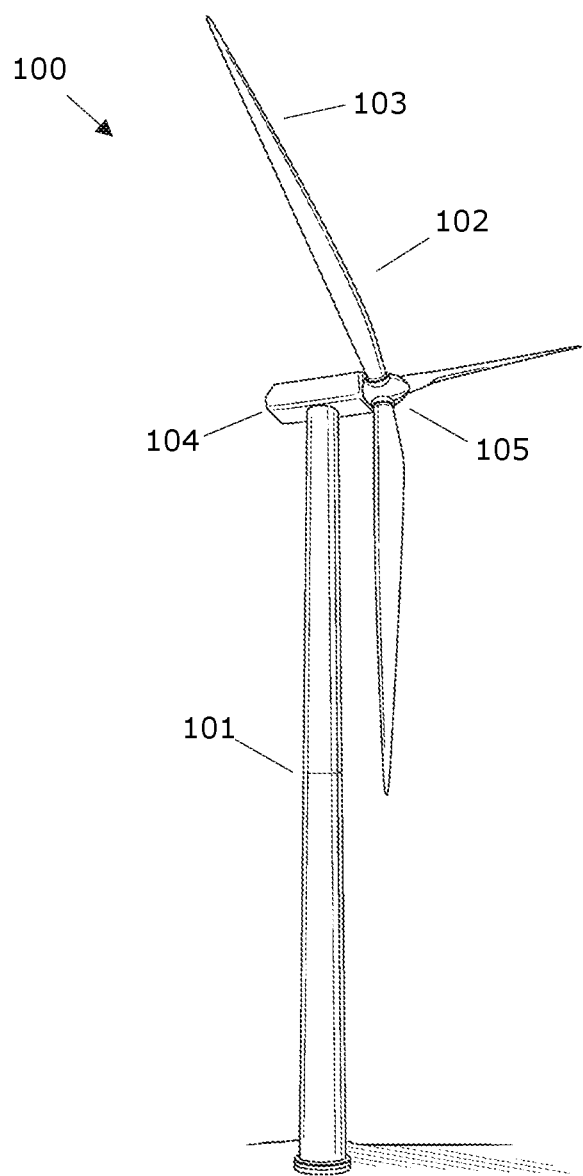
FIG. 1 illustrates a wind turbine.

FIG. 1 shows a wind turbine 100 (WTG) comprising a tower 101 and a rotor 102 with at least one rotor blade 103. Typically, three blades are used, but a different number of blades can also be used. The blades 103 are connected with the hub 105, which is arranged to rotate with the blades. The rotor is connected to a nacelle 104, which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter.

Figure 2:
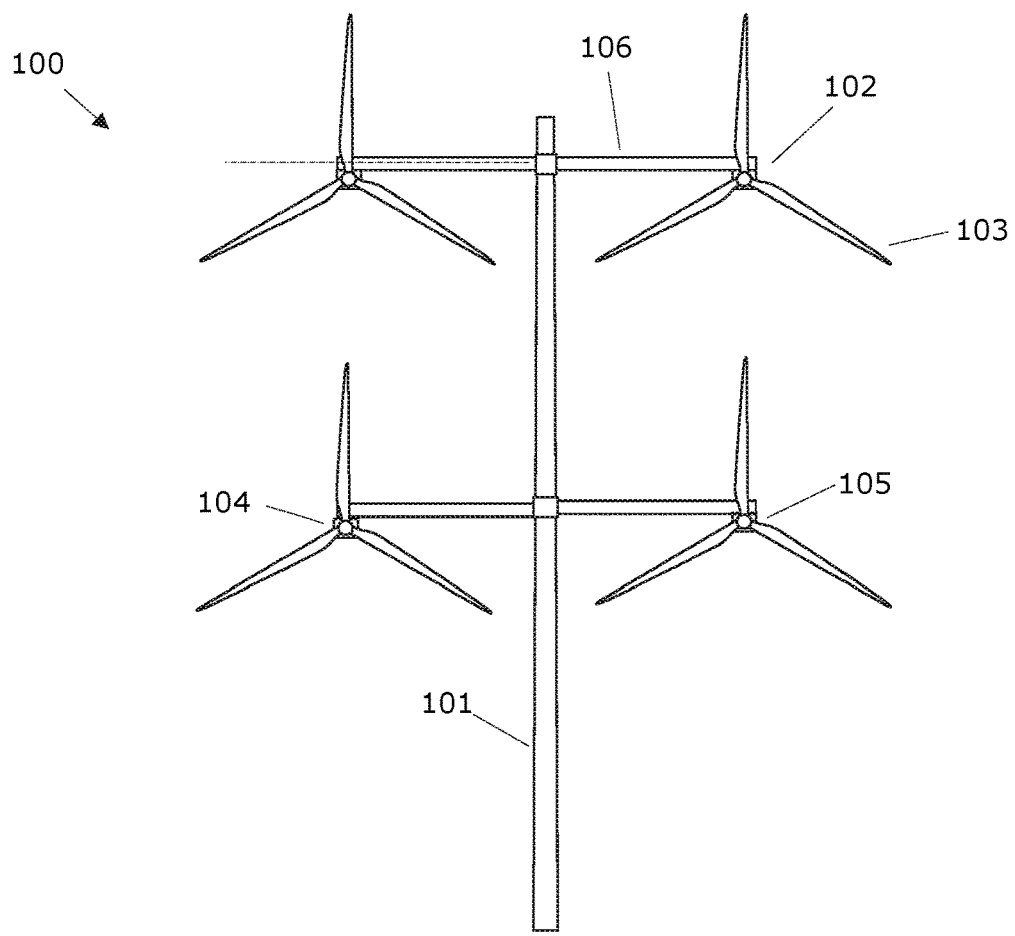
FIG. 2 illustrates wind turbines configured as multi-rotor wind turbines.
Figure 2:
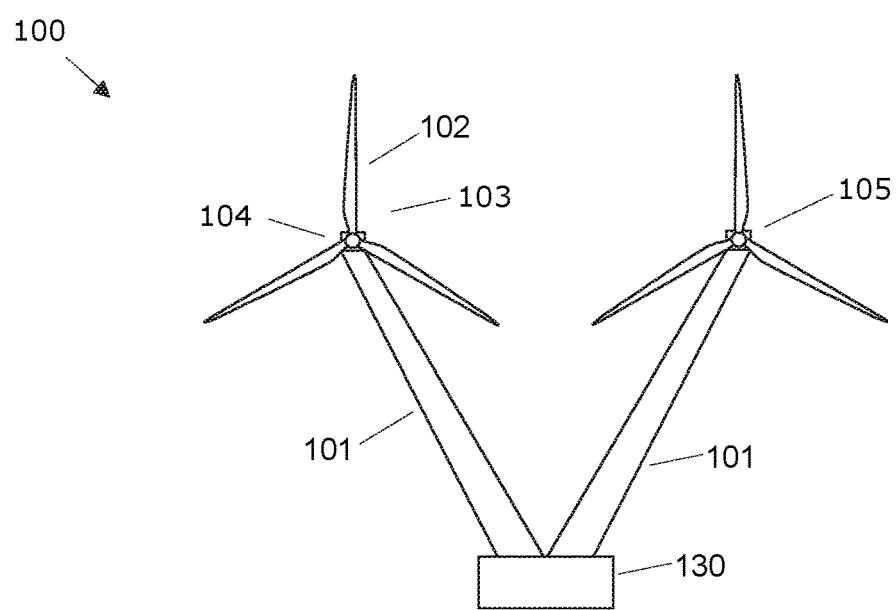

FIG. 2 shows alternative wind turbines 100 configured as multi-rotor wind turbines. Multi-rotor wind turbines comprises a plurality of nacelles 104. Here an example of 4 nacelles is shown, but in general two or more nacelles may be used in a multi-rotor turbine. The nacelles 104 can be supported, as illustrated in the upper drawing, via a tower 101 and support arms 106 extending outwardly from the tower 101 so that the nacelles are placed away from the tower and on opposite sides of the tower. Alternatively, as illustrated in the lower drawing, the nacelles 104 can be supported by angled towers 101 extending from a foundation 130, e.g. a ground or floating foundation, so that two or more nacelles 104 are sufficiently separated from each other at a given height. Embodiments of the present invention may be used with multi-rotor wind turbines or single-rotor wind turbines.

Figure 3:
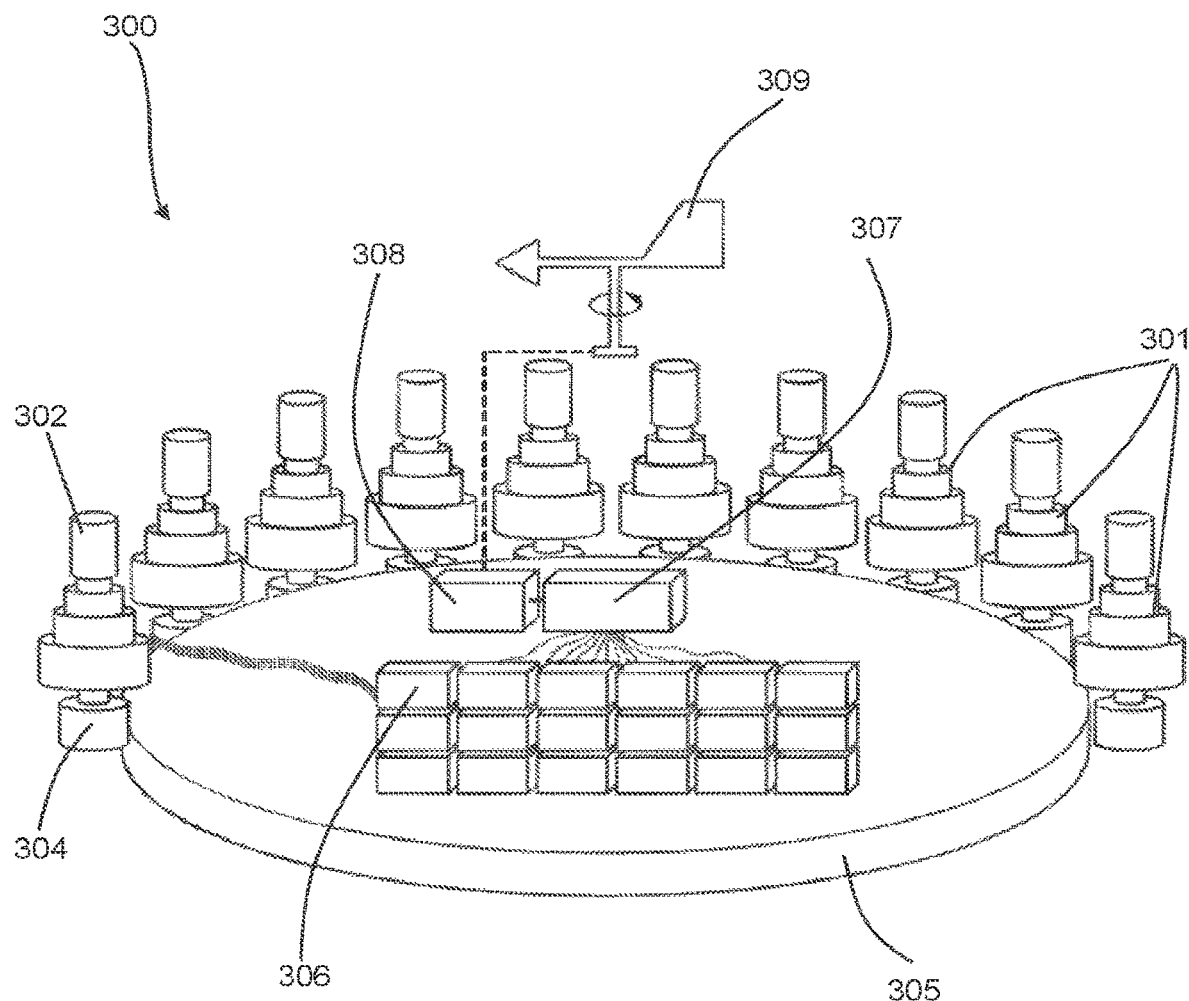
FIG. 3 illustrates the yaw system.

FIG. 3 shows an embodiment of a yaw system in accordance with the present invention. In the illustrated example, the yaw system comprises eighteen yaw drive actuators 301 of which ten is shown on FIG. 3. In other configurations, more or less yaw drive actuators may be used. Each yaw drive actuator 301 comprises a motor 302, in this embodiment an electrical drive motor, and a pinion 304 is connecting the yaw drive actuator 301 and the yaw ring 305. Further, the yaw drive actuator 301 comprises a variable frequency drive (VFD) 306.

The motors 302 may be of the asynchronous induction motor type, each being powered by a separate variable frequency drive 306, and enabling individual motor control. The frequency drives 306 are seen in FIG. 3 to be clustered in a cabinet in the centre and being connected to the motor controller 307, however the frequency drives 306 can be placed in other locations as well.

The motor 302 comprises an encoder, which is a position meter, detecting the position of the motor, and from the changes in the position, the motor speed can be derived. The encoder is used to detect the speed of the motor 302 and return the speed to the frequency drive 306.

The encoder may be used for every motor 302 to detect the position and speed of the motor 302 and to ensure load sharing, while avoiding overloading any of the motors 302.

The motor controller 307 outputs the required motor torque reference 403 to the variable frequency drives 306, and the motor controller 307 receives information about the motor speed either through communication with the encoder, the individual variable frequency drives 306 or through communication with the turbine controller 308, the mean motor speed reference 402 may be calculated by the motor controller or by the turbine controller. Further, the motor controller 307 receives signals from the turbine controller 308 about when to yaw and in which direction based on input from the wind direction device 309.

The turbine controller 308 may control the yaw system 300, and the turbine controller 308 activates the motor controller 307 when yawing is needed.

Figure 4:
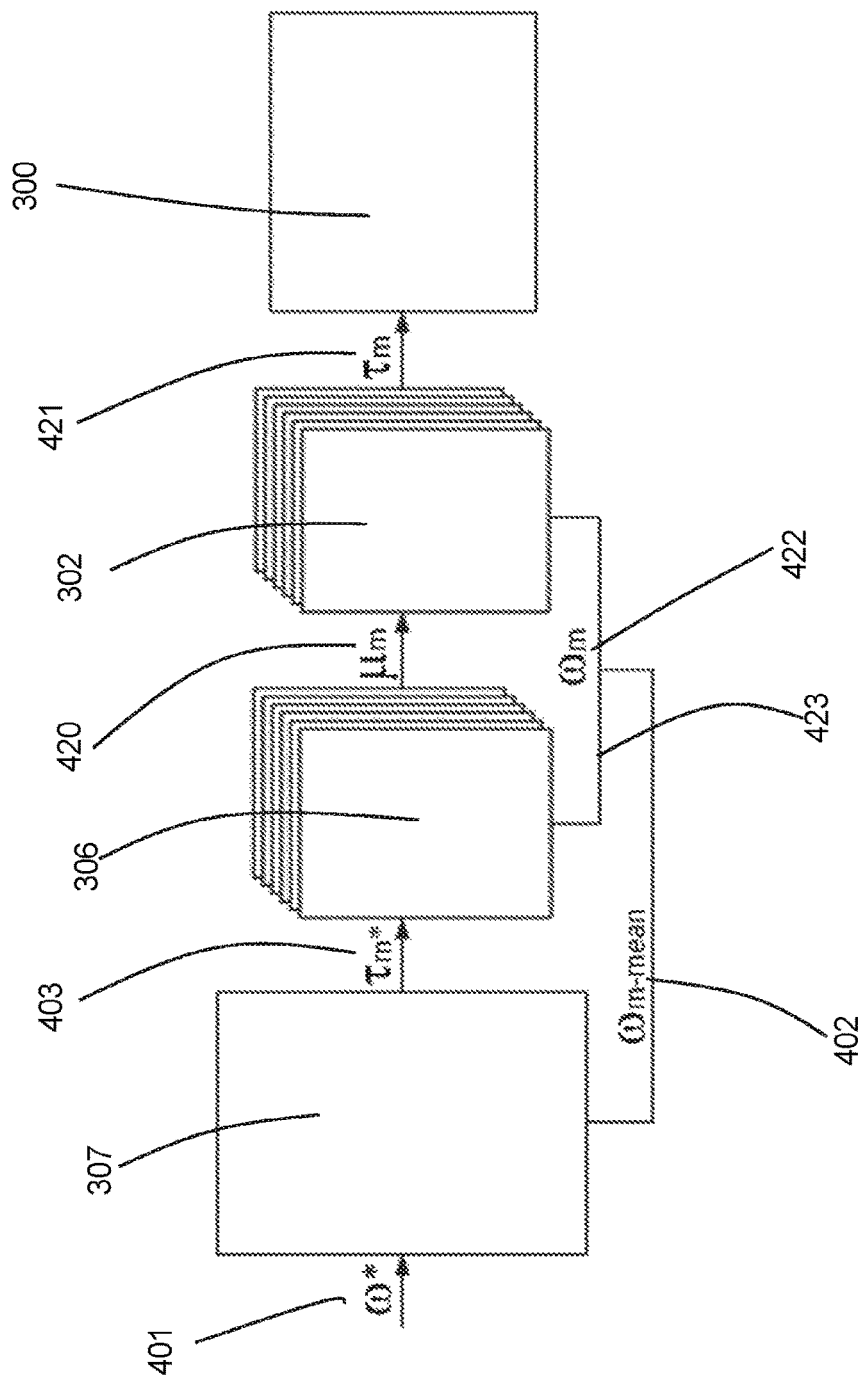
FIG. 4 illustrates the yaw control.

FIG. 4 is a schematic illustration of an embodiment of the yaw control scheme. The yaw control comprises a centralized control structure, where a single motor controller 307 is operating all the yaw drive actuators 301 based on a requested motor speed reference 401 and a mean motor speed reference 402 of all the motors 302, or of a selected subgroup of the motors 302.

The selected subgroup of motors 302 might not include the fastest and/or the slowest motor 302 for increased robustness or the selected subgroup of motors 302 might not include motors 302 running faster than a high-speed threshold speed and/or slower than a low-speed threshold speed.

Under normal operation the same torque, the required motor torque reference 403 is requested for all yaw drive actuators 301 to ensure even load distribution. However, the torque reference for each individual drive may be distributed unevenly if requested, for instance when passing a yaw segment split where a reduced torque may be desired or during self-check where each drive is tested individually.

The required motor torque reference 403 sent from the motor controller 307 to the yaw drive actuator is received by the variable frequency drives 306. The variable frequency drives 306 then sends a motor signal 420 to the motor 302, which is then applying the motor shaft torque 421 to the yaw system 300 and the pinion 304 to transfer the torque to the yaw ring 305.

Based on the motor speed 422 from each motor 302, either the turbine controller 308 or the motor controller calculates a mean motor speed reference 402 as a feedback signal to the motor controller 307. The motor controller may calculate it own feedback signal in a computing block separate from the control loop computing block. In addition, the motor speed for each motor 302 is sent as a feedback signal via the inner torque control loop 423 back to the variable frequency drive 306.

Figure 5:
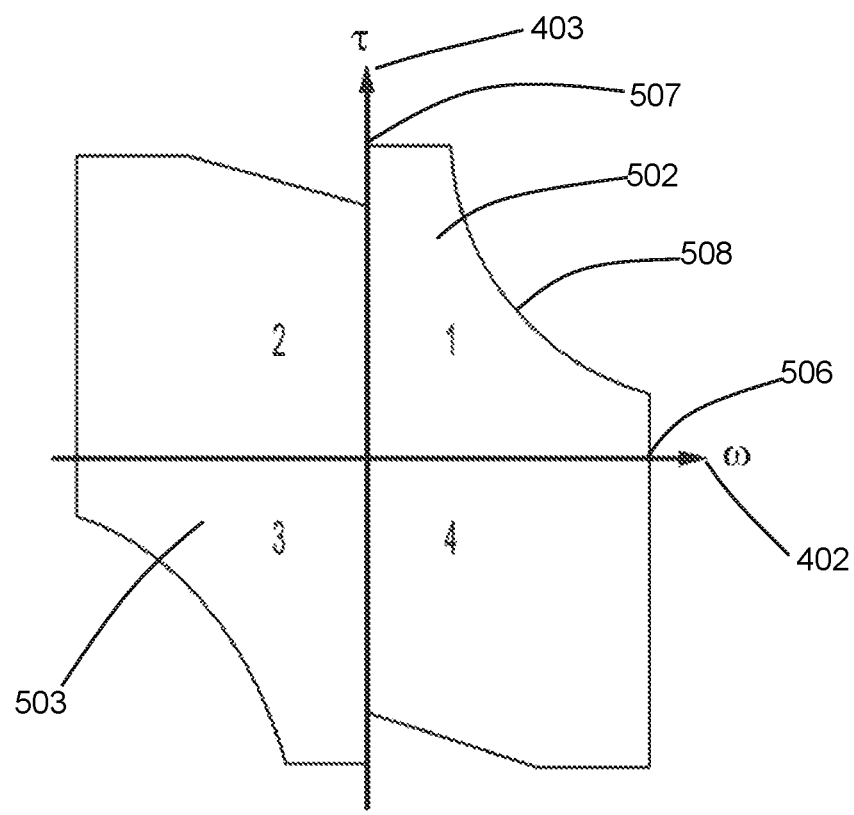
FIG. 5 illustrates the operation envelope.

FIG. 5 shows an example of an operation envelope 501 used for 4-quadrant control of the motors. The operation envelope 501 is a coordinate system where the x-axis is the mean motor speed reference 402 and the y-axis is the required motor torque reference 403 applied to the motors 302.

The limited motor speed reference 407 (FIG. 6) calculated by the motor controller 307 is not allowed to be higher than the maximum motor speed 506. The maximum motor speed 506 is illustrated by the vertical curve part in the first quadrant 502.

The required motor torque reference 403 calculated by the motor controller 307 is not allowed to be higher than the maximum torque 507. The maximum torque 507 is illustrated by the horizontal curve part in the first quadrant 502.

The curved part 508 of the curve in the first quadrant 502 is illustrating the relationship between speed and torque under consideration of the maximum power use reference 405. When the motors are running with a high speed, the torque that can be applied is limited by the maximum power use reference 405.

The third quadrant 503 is equivalent to the first quadrant 502, only rotating the motors 302 in the opposite direction.

Figure 6:
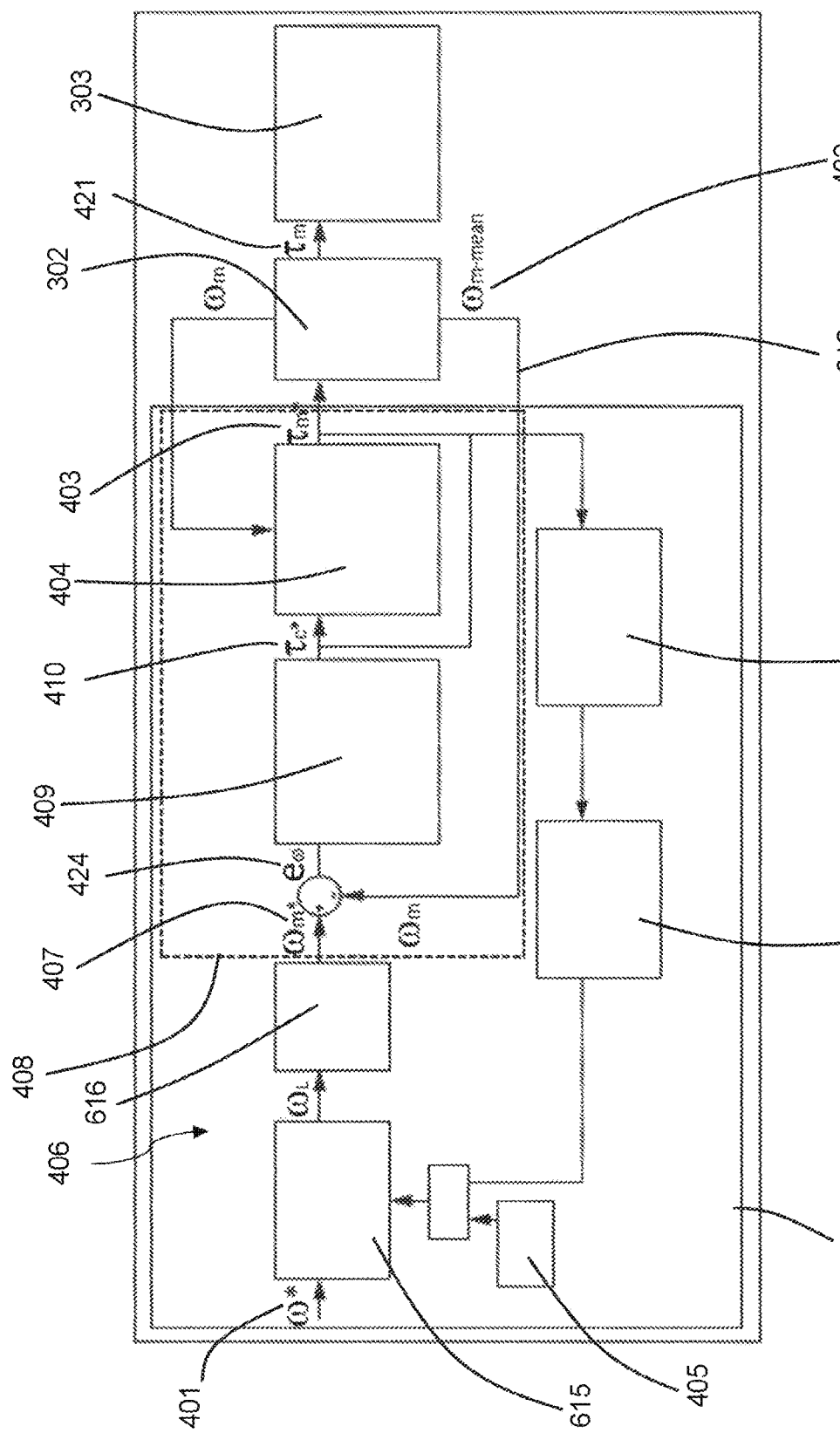
FIG. 6 illustrates the motor controller for each drive.

FIG. 6 illustrates a graphical illustration of an embodiment of the motor controller 307.

The objective for the motor controller 307 is to determine the required motor torque reference 403 needed to yield the requested motor speed reference 401.

The control strategy comprises two feedback control loops in a cascaded structure where both torque and speed control is used. The two feedback loops comprises an inner loop and an outer loop. The inner loop is shown on FIG. 4 as an inner torque control loop, where it is illustrated to be handled by the variable frequency drive 306, which receives the required motor torque reference 403 from the motor controller 307. While, the variable frequency drive 306 is not shown on FIG. 6 is placed between the motor controller 307 and the motor 302 as illustrated in FIG. 4.

The inner torque control loop 423 is handled by the variable frequency drive 306, such that the output is a torque reference for obtaining the desired motor torque. Ideally, the motor shaft torque 421 is equal to the required motor torque 403.

The outer feedback loop is illustrated in FIG. 6 as the speed control loop 612 returning the mean motor speed reference 402 to the speed control unit 408. The speed control unit receives the limited motor speed reference 407 as input signal and the mean motor speed reference 402 as a feedback signal and sends the required motor torque reference 403 as output to the motors 302.

The speed control unit consists of a PI controller 409 and a torque limiter 404.

The PI-controller 409 is a proportional-integral controller used for speed control, since it yields unity DC-gain and great disturbance rejection. The speed control loop 612 refers the mean motor speed reference 402 back to the speed control unit 408. The mean motor speed reference 402 is subtracted from the limited motor speed reference 407 to give an error signal 424 as input to the PI controller 409, and the PI controller 409 provides the calculated motor torque reference 410 as output. The PI control can also be a PID control, but in the embodiment described, the derivative (D) part in the PID is zero.

The torque limiter 404 limits the torque to the maximum torque 507 during operation in quadrant 1 and 3 in FIG. 5. The torque limiter 404 receives the calculated motor torque reference 410 as input from the PI-controller 409 and delivers the required motor torque reference 403 as an output signal.

The dynamical speed limiter 406 is used to limit the speed reference determining the limited motor speed reference 407. The requested speed reference 401 is received from the turbine controller 308, but may be reduced due to power limitation according to the maximum power use reference 405. Further, the speed can be reduced in the speed saturation routine 615 to not exceed the maximum power speed 506 and the speed ramp routine 616 ensures not to accelerate the motors to exceed a maximum speed change rate.

A feedback of the required motor torque reference 403 is also used by the dynamic speed limiter 406 after going through a low-pass filter 618 and a direction saturation filter 617, which basically ensures the feedback signal has a minimum numerical value and is not zero.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a yaw of a wind turbine system, the wind turbine system comprises a nacelle, a tower, a turbine controller and a yaw system, the yaw system is operable to rotate the nacelle with respect to the tower, the yaw system comprises a motor controller and a plurality of yaw drive actuators;
the method, comprising:
receiving, by the motor controller, a requested motor speed reference, as an input signal,
receiving, by the motor controller, a mean motor speed reference, as a feedback signal, wherein the mean motor speed reference is an average that comprises a sum of motor speeds of a number of motors in at least two of the plurality of yaw drive actuators, divided by the number of the motors, and
providing, by the motor controller, a required motor torque reference, as an output signal, for the plurality of yaw drive actuators to rotate the nacelle, determined according to the input signal and the feedback signal.

2. The method for controlling the yaw of the wind turbine system according to claim 1, wherein, when the yaw system is operating in a normal operation mode, the motor controller calculates one required motor torque reference, and the motor controller sends the one required motor torque reference to all of the plurality of yaw drive actuators.

3. The method for controlling the yaw of the wind turbine system according to claim 1, and the mean motor speed reference is calculated as the average comprising the sum of the motor speed of all motors in the wind turbine system, divided by the number of all motors.

4. The method for controlling the yaw of the wind turbine system according to claim 1, and the mean motor speed reference is calculated as the average comprising the sum of the motor speed of a selected subgroup of motors in the wind turbine system, divided by the number of motors in the selected subgroup of motors.

5. The method for controlling the yaw of the wind turbine system according to claim 4, wherein the selected subgroup of motors includes, in the calculation of the mean motor speed reference, the motors with a motor speed less than a high-speed threshold speed and/or the motors with a motor speed greater than a low-speed threshold speed, wherein at least one of the motors not in the selected subgroup of motors has a motor speed higher than the high-speed threshold speed and/or a motor speed lower than the low-speed threshold speed.

6. The method for controlling the yaw of the wind turbine system according to claim 1, wherein the required motor torque reference is limited by a torque limiter to not exceed a maximum torque.

7. The method for controlling the yaw of the wind turbine system according to claim 1, wherein the required motor torque reference is limited to avoid a motor speed that is higher than a maximum motor speed.

8. The method for controlling the yaw of the wind turbine system according to claim 1, wherein the motor controller further receives as input a maximum power use reference and wherein, a limited motor speed reference is limited to not requiring more power than available according to the maximum power use reference.

9. The method for controlling the yaw of the wind turbine system according to claim 1, wherein a change in motor speed is not exceeding a maximum speed change rate.

10. The method for controlling the yaw of the wind turbine system according to claim 1, wherein the motor controller comprises a dynamic speed limiter,
the dynamic speed limiter calculates a limited motor speed reference based on the requested motor speed reference and a maximum power use reference, so that
the limited motor speed reference is not higher than a maximum motor speed, and
a change in motor speed is not exceeding a maximum speed change rate, and
a power use is not exceeding the maximum power use reference.

11. The method for controlling the yaw of the wind turbine system according to claim 10, wherein the motor controller comprises a speed control unit,
the speed control unit comprises a proportional-integral-derivative (PID) control,
the PID control calculates a calculated motor torque reference based on the limited motor speed reference and the mean motor speed reference, and
the calculated motor torque reference is used to determine the required motor torque reference.

12. The method for controlling the yaw of the wind turbine system according to claim 10, wherein a speed control unit further comprises a torque limiter,
the torque limiter determines the required motor torque reference based on a calculated motor torque reference, so that the required motor torque reference does not exceed a maximum torque.

13. The method for controlling the yaw of the wind turbine system according to claim 1, wherein the wind turbine system comprises a plurality of nacelles and the yaw system is arranged to rotate one or more of the plurality of nacelles.

14. A control system for controlling a yaw of a wind turbine system comprising a nacelle, a tower, and a yaw system operable to rotate the nacelle with respect to the tower and comprising a motor controller and a plurality of yaw drive actuators; wherein the control system comprises:
an input/output (I/O) interface; and
one or more processors communicatively coupled to the (I/O) interface, and programmed to perform an operation, comprising:
receiving, by the motor controller, a requested motor speed reference, as an input signal,
receiving, by the motor controller, a mean motor speed reference, as a feedback signal, wherein the mean motor speed reference is an average that comprises a sum of motor speeds of a number of motors in at least two of the plurality of yaw drive actuators, divided by the number of the motors, and
providing, by the motor controller, a required motor torque reference, as an output signal, for the plurality of yaw drive actuators to rotate the nacelle, determined according to the input signal and the feedback signal.

15. A wind turbine system, comprising:
a tower;
a nacelle disposed on the tower;
a yaw system operable to rotate the nacelle with respect to the tower, wherein the yaw system comprises a motor controller and a plurality of yaw drive actuators; and a control system configured to perform an operation, comprising:
  receiving, by the motor controller, a requested motor speed reference, as an input signal,
  receiving, by the motor controller, a mean motor speed reference, as a feedback signal, wherein the mean motor speed reference is an average that comprises a sum of motor speeds of a number of motors in at least two of the plurality of yaw drive actuators, divided by the number of the motors, and
  providing, by the motor controller, a required motor torque reference, as an output signal, for the plurality of yaw drive actuators to rotate the nacelle, determined according to the input signal and the feedback signal.

* * * * *